United States Patent [19]

Baskett

[11] Patent Number: 5,743,484

[45] Date of Patent: Apr. 28, 1998

[54] BUILDING WRAP DISPENSER AND METHOD OF USE

[75] Inventor: Jeffrey W. Baskett, Seattle, Wash.

[73] Assignee: K2, Inc., Adrian, Mich.

[21] Appl. No.: 845,128

[22] Filed: Apr. 21, 1997

[51] Int. Cl.⁶ .......................... B65H 16/06; B65H 75/18
[52] U.S. Cl. .................. 242/557; 242/578; 242/578.2; 242/596.1; 242/596.8
[58] Field of Search ...................... 242/557, 578, 242/578.2, 596.1, 596.7, 596.8, 597.7, 406; 52/746.1, 749.1

[56] References Cited

U.S. PATENT DOCUMENTS

| | | | |
|---|---|---|---|
| 1,116,834 | 11/1914 | Nelson | 242/596.1 |
| 1,701,045 | 2/1929 | Kraus . | |
| 1,701,046 | 2/1929 | Kraus . | |
| 2,480,461 | 8/1949 | Gabrielson | 242/578.2 |
| 2,598,992 | 6/1952 | Gordon | 242/596.1 |
| 2,622,752 | 12/1952 | Herzog et al. . | |
| 3,958,772 | 5/1976 | Hynson | 242/557 |
| 4,049,140 | 9/1977 | Roose | 242/557 |
| 4,705,229 | 11/1987 | Barazone | 242/557 |
| 5,060,878 | 10/1991 | Hutzenlaub et al. | 242/596.1 |
| 5,163,634 | 11/1992 | Moon et al. . | |
| 5,553,807 | 9/1996 | Lopez . | |
| 5,582,216 | 12/1996 | Smith . | |
| 5,667,165 | 9/1997 | Gardner | 242/596.1 |
| 5,685,054 | 11/1997 | Yasnogorodskiy et al. | 242/557 |

*Primary Examiner*—John M. Jillions
*Attorney, Agent, or Firm*—Donald R. Fraser

[57] ABSTRACT

A device for dispensing building wrap in the form of a continuous sheeting from a supported supply roll wherein the device is capable of metering the rotation of at least one of two rotatingly mounted spindles. Brackets are provided to facilitate the temporary mounting of the device to the vertical surface of a building surface to be covered by the sheeting.

10 Claims, 4 Drawing Sheets

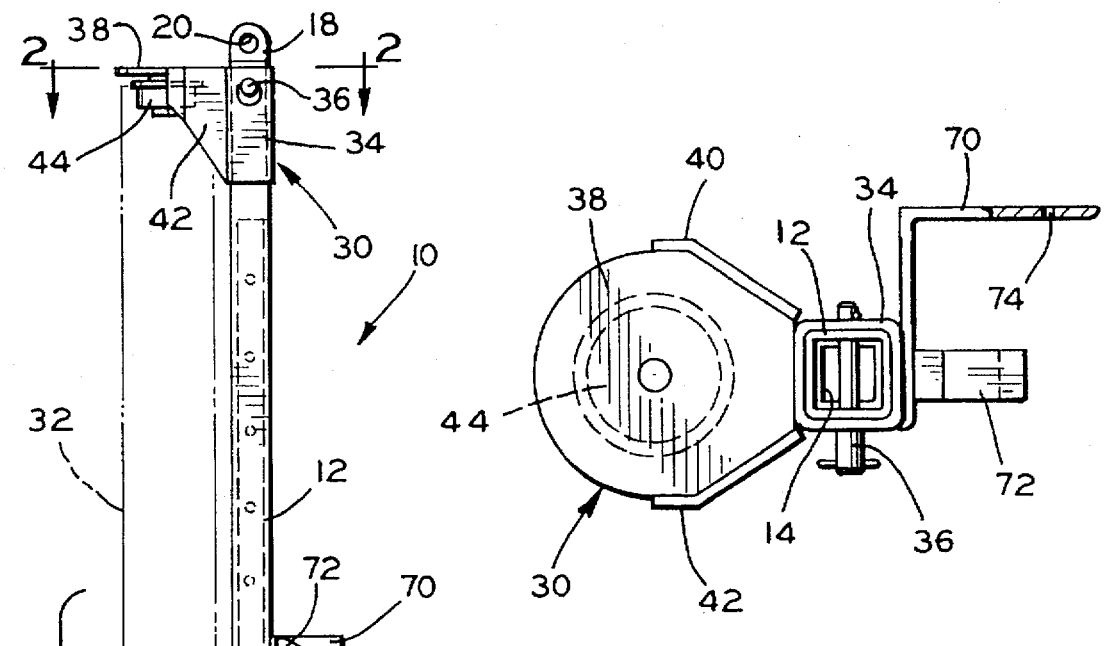
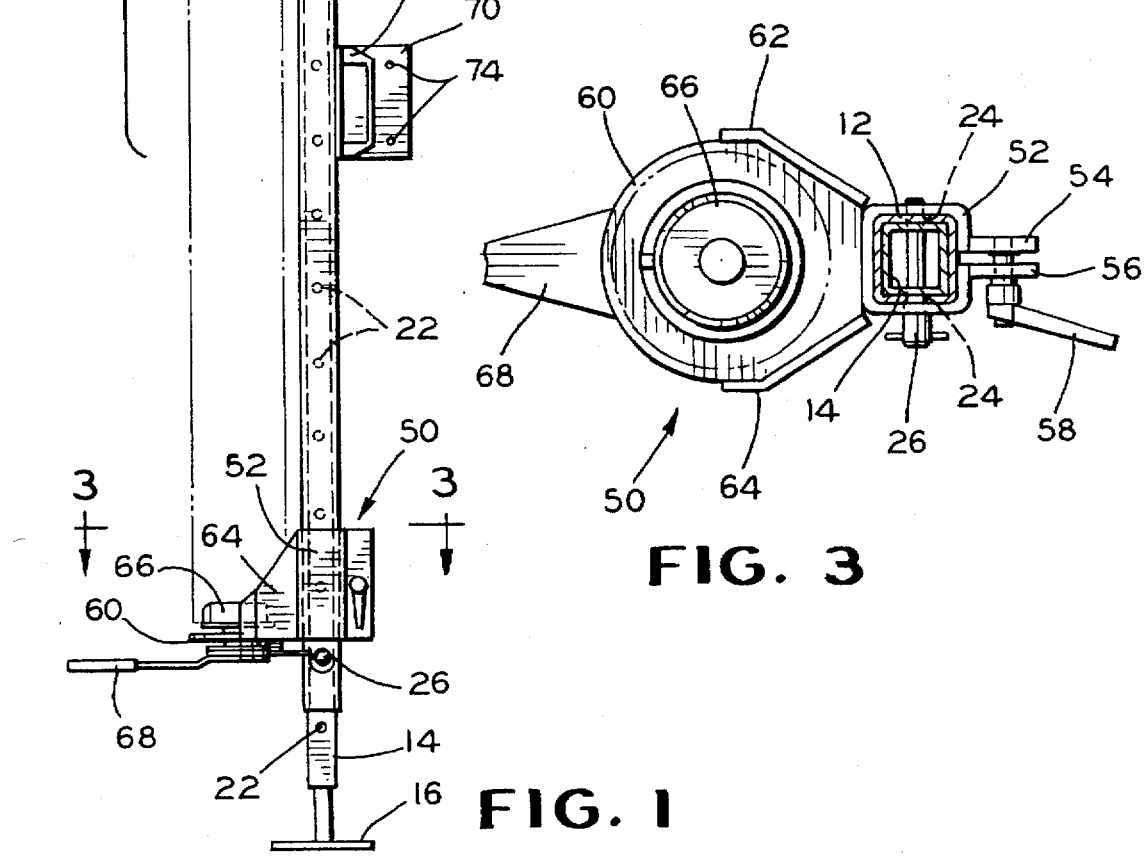
FIG. 2
FIG. 3
FIG. 1

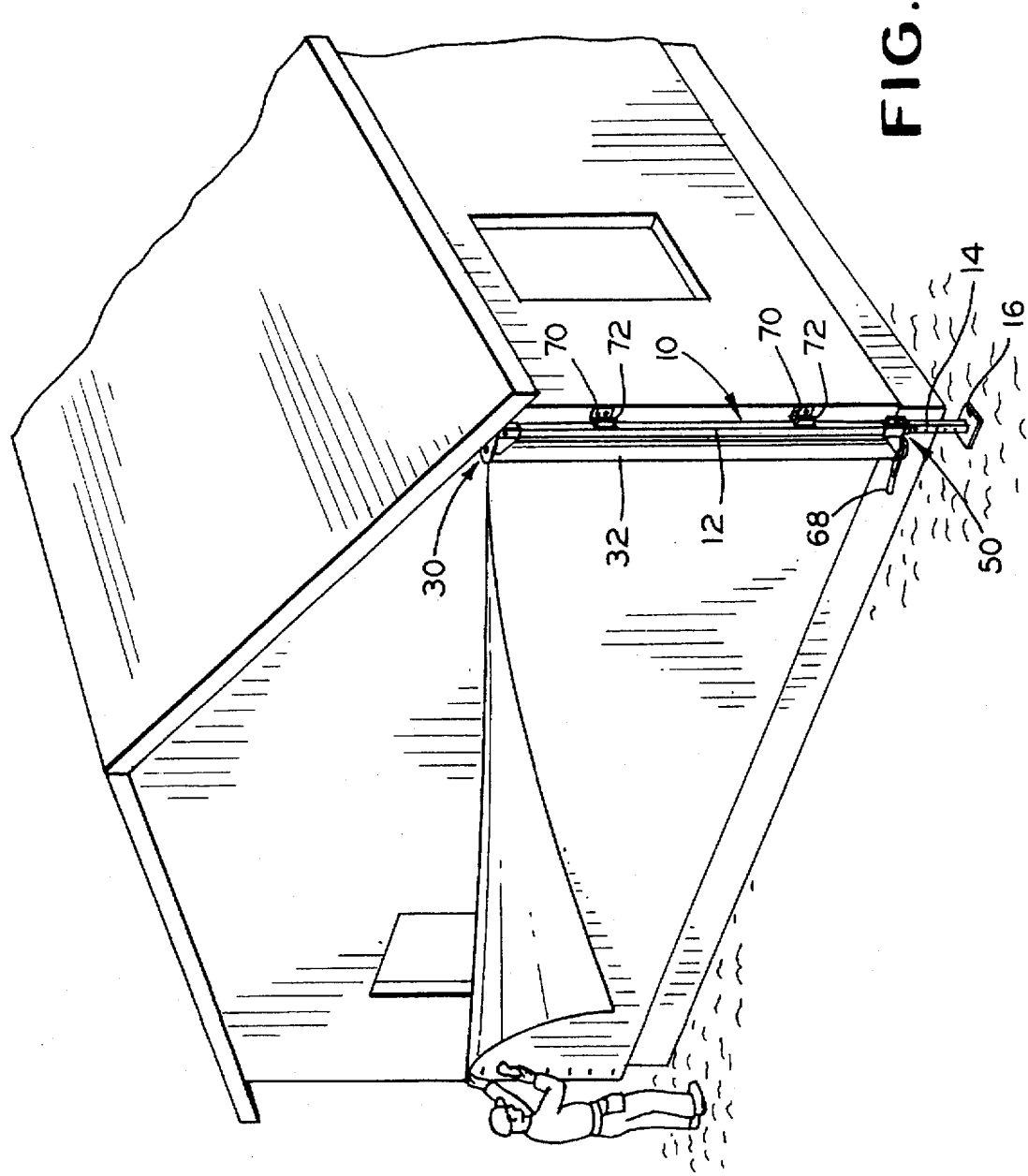

BUILDING WRAP DISPENSER AND METHOD OF USE

BACKGROUND OF THE INVENTION

The advent of higher fuel costs for heating and cooling buildings has focused attention on improving building techniques to render new construction, as well as restoration procedures more energy efficient. One of the products used to achieve greater energy efficiency is the use of building wrap sheeting applied over the conventional sheathing. The use of such sheeting is effective in insulating the walls of the building against wind and water. Typically, such materials are attached or secured outside the sheathing in the walls of buildings, especially in cold climates.

1. Field of the Invention

This invention relates to apparatus for supporting and dispensing rolls of building wrap sheeting material to facilitate the application thereof to an associated building.

2. Prior Art

It is known to apply building wrap sheeting to the outside walls of building by placing a roll of such sheeting material in a vertical position. An operator is employed to hold the roll and another person grasps the leading edge of sheeting and then with the assistance of the first mentioned operator causes the sheeting to be payed off from the supply roll in sufficient length to cover an entire vertical surface. Once the needed length of sheeting has been payed off from the supply roll, the sheeting is manually held in position while another person secures the thus positioned sheeting to the building wall by nailing, stapling or the like. This procedure is repeated until the entire building is completely covered by the building wrap sheeting material. It will be appreciated that the above described procedure is employed for the first floor of a building. The procedure for applying the building wrap sheeting to the outer surfaces of the upper floors will vary dependent upon the experience of the persons assigned for the task. Clearly, the upper level work becomes somewhat more difficult and requires the use of ladders and/or scaffolding to accomplish the application procedure.

SUMMARY OF THE INVENTION

The present invention relates to a device for supporting a roll of building wrap sheet material and for dispensing the sheet material to facilitate the application of the sheet material to the outer surfaces of the sheathing of building construction.

It is an object of the invention to produce a device of the character indicated above which is adjustable to accommodate rolls of building wrap sheet material of varying lengths.

Another object of the invention is to produce a device of the character indicated above which is relatively simple in construction, rugged in design and may be economically manufactured.

These and other objects of the invention may be readily achieved by a device for supporting a roll of sheet material in an axial vertical position and for dispensing the sheet material to facilitate the application of the same to the vertical surfaces of a building comprising a vertically extending columnar member having a ground engaging base, a lower spindle releasable secured to the columnar member for rotatingly supporting the lower end of the roll of sheet material to enable the sheet material to be dispensed therefrom; an upper spindle releasably secured to the columnar member in spaced apart relation in respect of the lower spindle for rotatingly supporting the upper end of the roll of sheet material; means for metering the rotation of at least the lower or the upper spindle; and bracket means extending laterally from the columnar member and having apertures formed therein for receiving fasteners for releasably securing the columnar member to a vertical surface of a building to which the sheet material is to be applied.

BRIEF DESCRIPTION OF THE DRAWINGS

The above, as well as other objects and advantages of the invention, will become readily apparent to one skilled in the art from reading the following detailed description of the preferred embodiment of the invention when considered in the light of the accompanying drawings, in which:

FIG. 1 is a fragmentary elevational view of a device for supporting a roll of building wrap sheet material embodying the features of the present invention;

FIG. 2 is a sectional view of the device illustrated in FIG. 1 taken along line 2—2 thereof;

FIG. 3 is a sectional view of the device illustrated in FIG. 1 taken along line 3—3 thereof;

FIG. 4 is a fragmentary view showing the device illustrated in FIG. 1 attached to a building with the building wrap sheet material payed off from the supply roll supported by the device of the invention wherein the leading edge is being applied to the outer surface of a portion of a building;

DETAILED DESCRIPTION OF THE PREFERRED EMBODIMENT

Figure 5:
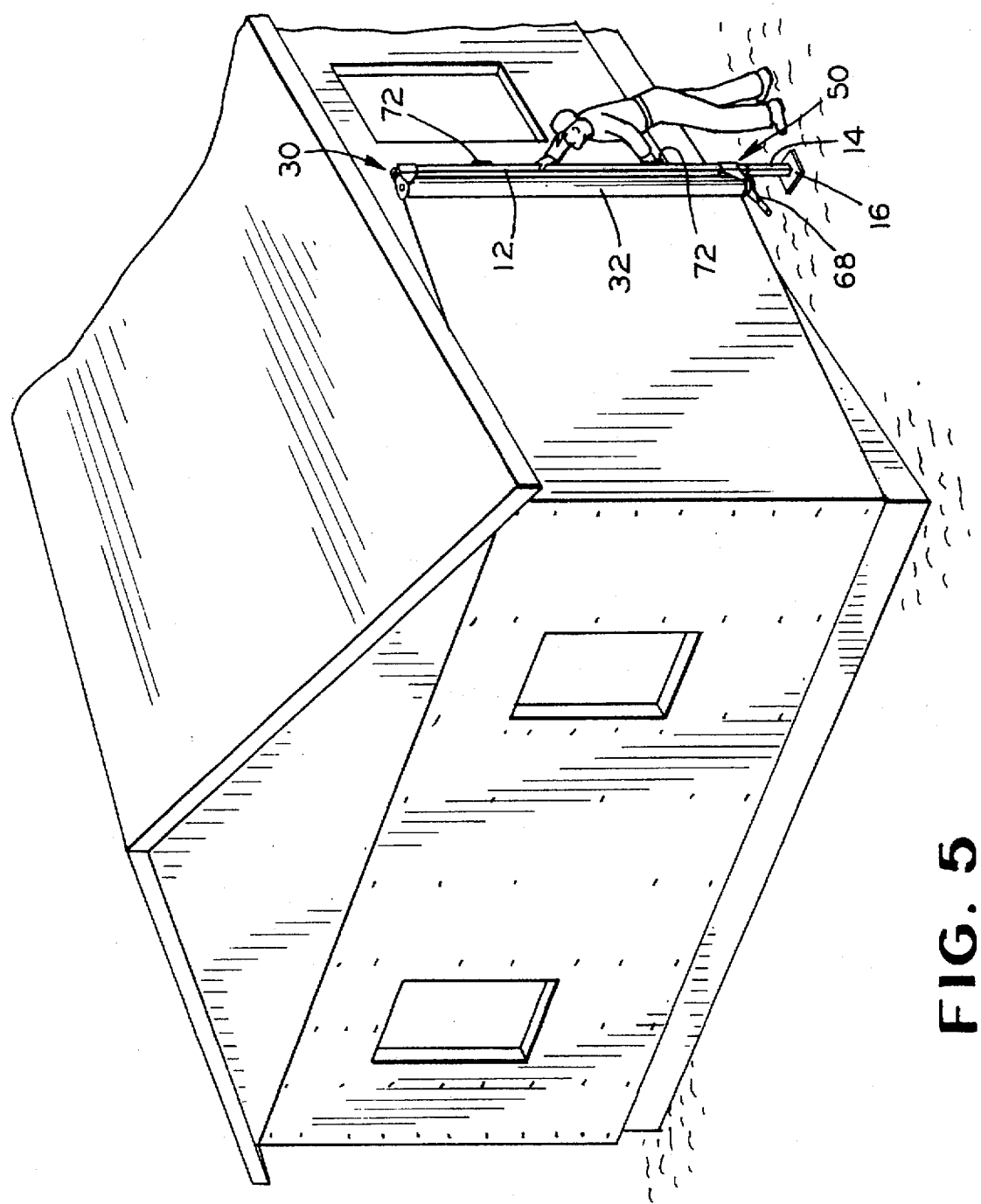
FIG. 5 is a fragmentary view similar to FIG. 4 showing the building wrap sheet material secured to the one surface of the building and illustrating the subsequent movement of the supply roll of sheet material and the support device being moved to a new position.

Referring to the drawings and in particular FIGS. 1, 2, and 3, there is illustrated a device for supporting a roll of sheet material in an axial vertical position and for dispensing the sheet material. The device, generally indicated by reference numeral 10, embodies the features of the present invention.

The device 10 includes an upstanding vertically extending hollow outer columnar member 12 having an associated internal columnar member 14 telescopingly received within the hollow internal of the outer member 12.

In order to militate against relative rotational movement of the outer and internal members 12, 14, it has been advantageous to utilize metal stock of generally square cross-sectional configurations. The outermost lower end one the internal member 14 is provided with a ground engaging base plate 16. The upper end of the outer member 12 is provided with an upwardly extending bracket 18 having an aperture 20.

The internal columnar member 14 is provided with a plurality of spaced apart pairs of aligned apertures 22. The outer columnar member 12 is provided with at least one pair of aligned apertures 24. When the desired axial length of the device 10 is determined, the set of apertures 24 are aligned with the most appropriately positioned set of apertures 22 and a pin 26 is inserted to extend through the aligned apertures to maintain the desired overall length of the device 10.

An upper bracket 30, for receiving an upper end of a supply roll 32 of building wrap sheeting, is mounted over the upper portion of the columnar member 12. The bracket 30 has a main body portion 34 of a square cross-sectional configuration to fit over the outer surface of the outer columnar member 12 and is provided with apertures alignable with apertures in the member 12 of a size to receive a pin 36 to fix the bracket 30 to the columnar member 12. The bracket 30 further includes an upper plate 38 which is fixedly attached to the main body portion 34 by a pair of outwardly extending flared apart flanges 40, 42. A spindle hub 44 is rotatingly mounted to the undersurface of the plate 38. The spindle hub 44 is provided to be received within and maintain the upright position of the supply roll 32 of the sheeting material to be dispensed.

A lower bracket 50, for receiving the lower end of the supply roll 32, is mounted over the lower portion of the columnar member 12. The bracket 50 has a main body portion 52 of a cross-sectional configuration to fit over the outer surface of the outer columnar member 12. The main body portion 52 is split and has a pair of literally extending spaced apart flanges 54 and 56 which are coupled together by a manually adjustable threaded fastener 58. When the relative spacing of the brackets 30 and 50 is determined to secure the supply roll 32, the fastener 58 may be tightened to maintain the spacing.

The bracket 50 further includes a lower plate 60 which is fixed to the main body portion 52 by a pair of outwardly extending flared apart flanges 62, 64. A rotational spindle 66 is provided to be received within and maintain the position of the supply roll 32 of the sheeting material to be dispensed. A rachet and pawl mechanism is provided as means for metering and for controlling the rotation of the spindle 66 and, in turn, controlled by the operator through the use of a lever 68.

Spaced apart attaching brackets 70 are suitably secured to extend laterally from the outer columnar member 12. Each of the brackets 70 includes a handle 72 and spaced apart fastener receiving apertures 74.

Figure 6:
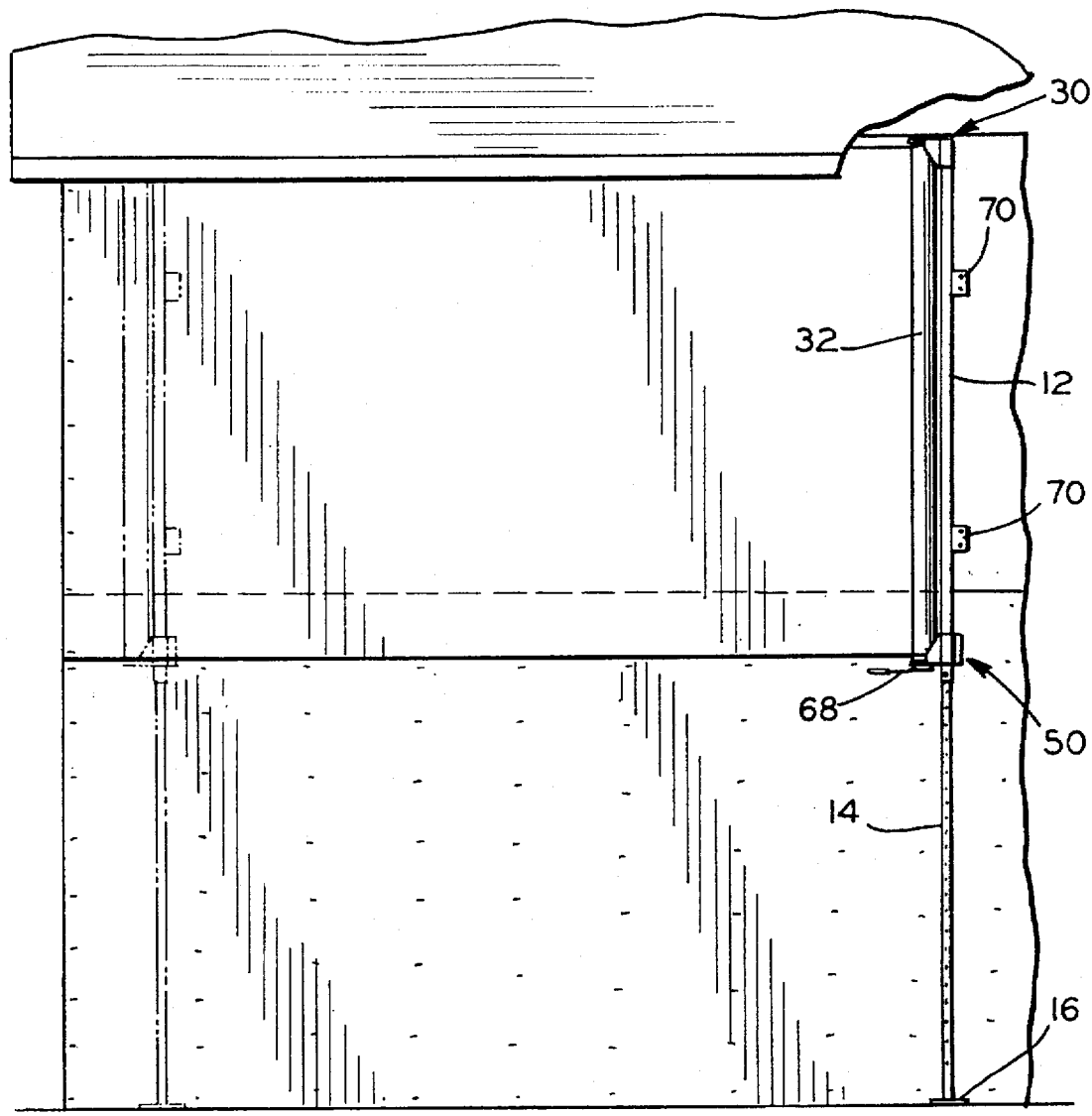
FIG. 6 is a fragmentary similar to FIGS. 4 and 5 showing the building wrap material being applied to the second floor level of a building.

While the device illustrated and described in reference to FIGS. 1, 2, and 3 may be utilized in a number of different sequences, FIGS. 4, 5, and 6 are representative of one of the efficient sequences which may be followed.

Initially, the device 10 is positioned adjacent the corner of a building, the outer vertical surfaces of which are to receive building wrap sheeting material. The base plate 16 is adapted to engage the earth, while the uppermost end may be held in place by causing the aperture 20 of the bracket 18 to receive a previously driven nail, or a hook on an associated ladder, for example.

The brackets 70 are suitably secured to the vertical sheathing by nails, for example. Next, the device 10 is prepared to receive the supply roll 32 of building wrap sheeting, by loosening the manually adjustable threaded fastener 58 and lowering the associated bracket 50. The supply roll 32 is positioned such that the upper and lower hubs 44, 66, respectively, are received within the respective ends of the supply roll 32. The adjustment is achieved by then urging the lower bracket 50 slightly upwardly and tightening the threaded fastener 58.

The procedure then entails the rendering of the rachet and pawl mechanism operative to allow for the building wrap sheeting to be payed off from the supply roll 32 by proper manipulation of the lever 68. The operator then grasps the leading free edge of the sheeting and pulls the same toward the opposite corner of the building and nails or staples the edge to the corner. Obviously, any openings, such as windows or doorways, which have been covered will be processed by properly removing a certain portion of the overlaying sheeting and overlapping the peripheral edges of the openings with the building wrap sheeting to assure a draftproof structure.

Upon completion of the stapling or nailing of the sheeting to the first vertical surface, the device 10 is unfastened from the initial position of FIG. 4 and is moved to a second position along an adjacent vertical surface as illustrated in FIG. 5.

As the device 10 and its associated roll 32 of building wrap sheeting is moved along the surface to be covered with the building wrap sheeting by grasping the handles 72, the sheeting is caused to be payed off from the supply roll 32, as illustrated in FIG. 5 and is thereafter properly nailed or stapled to the covered sheathing. The procedure is then replicated and repeated around the entire building. In order to facilitate the procedure, it will be appreciated that as soon as the desired quantity of sheeting is caused to pay-off from the supply roll 32, the rachet and pawl mechanism is caused to militate against the removal of any additional quantity until the lever 68 is actuated, for example.

FIG. 6 is an illustration of a typical operation wherein the first floor or lower level of the building has been covered with the building wrap sheeting and the device is used for applying a second tier or upper level of sheeting. More specifically, the device 10 is elevated and secured at the desired elevated position. The columnar length of the device is extended by withdrawing the pin 26 from the aligned aperture 24 in the outer columnar member 12 and apertures 22 of the inner member 14. The outer member 12 is then telescoped upwardly to the position illustrated in FIG. 6. The handles 72 may be used to hoist the outer member 12 to the elevated position. The pin 26 is then reinserted into the apertures 24 and the newly aligned apertures 22 of the inner member 14. Thereafter the fastener 58 is manually tightened; and the brackets 70 are fastened to the outer sheathing by driving fasteners, such as nails, for example, through the apertures 74. The building wrap sheeting may then be caused to be payed-off by properly positioning the control lever 68 of the rachet and pawl mechanism of the spindle 66.

In accordance with the provisions of the patent statutes, the present invention has been described in what is considered to represent its preferred embodiment. However, it should be understood that the invention can be practiced otherwise than as specifically illustrated and described without departing from its spirit or scope.

What is claimed is:

1. A device for supporting a supply roll of sheet material in an axial vertical position and for dispensing the sheet material to apply the same to the vertical surfaces of a building comprising:

a vertically extending columnar member having a ground engaging base;

a lower spindle releasably secured to said columnar member for rotatingly supporting the lower end of the roll of sheet material to enable the sheet material to be dispensed therefrom;

an upper spindle secured to said columnar member in spaced apart relation in respect of said lower spindle for rotatingly supporting the upper end of the roll of sheet material means for metering the rotation of at least one of said lower or upper spindle to control the dispensing of the sheet material from the supply roll; and bracket members extending laterally from said columnar member and having apertures formed therein for receiving fasteners for releasably securing said columnar member to a vertical surface of a building to which the sheet material is to be applied.

2. A device as defined in claim 1 wherein said means for metering includes a rachet and pawl mechanism for selectively controlling the rotation of said lower or upper spindle.

3. A device as defined in claim 1 wherein said columnar member is vertically extensible.

4. A device as defined in claim 1 wherein said columnar member includes at least two cooperating telescoping members.

5. A device as defined in claim 2 including means for selectively adjusting the spacing between said lower spindle and said upper spindle.

6. A device as defined in claim 5 wherein said means for selectively adjusting the spacing between said lower spindle and said upper spindle includes a bracket surrounding said vertically extending columnar member having a threaded fastener means for releasably securing said bracket to said columnar member.

7. A device as defined in claim 6 wherein said bracket surrounding said columnar member includes a split collar.

8. A device as defined in claim 1 including at least one handle extending laterally from said columnar member.

9. A device as defined in claim 7 including a handle integral with each of said bracket members extending laterally from said columnar member.

10. A device as defined in claim 1 wherein said upper spindle is releasably secured to said columnar member.

* * * * *